May 2, 1961 O. R. THOMPSON 2,982,661
METHOD FOR PRODUCING CONSUMER SIZE SEMI-CYLINDRICAL
PACKAGES OF CHEESE OF UNIFORM WEIGHT
Filed Jan. 20, 1958 3 Sheets-Sheet 2
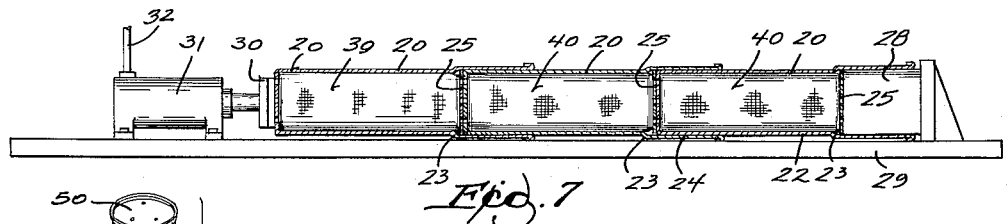
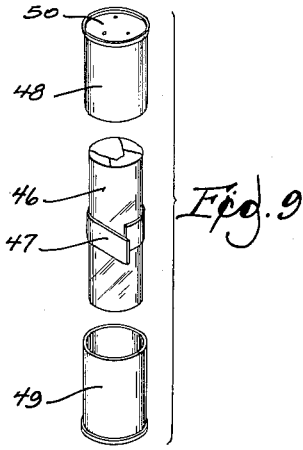
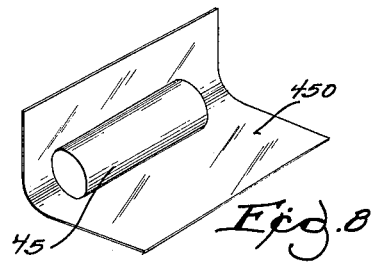
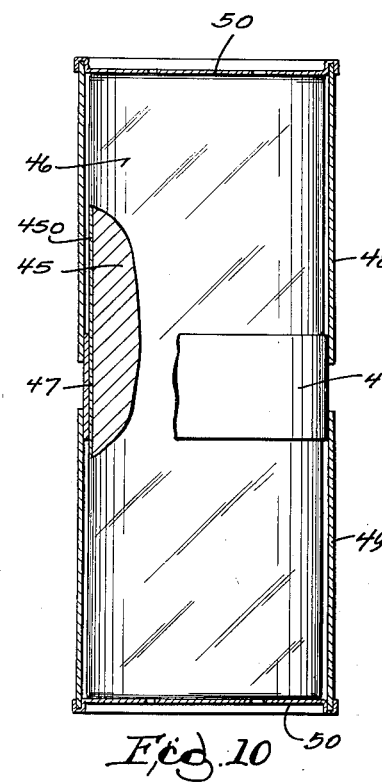
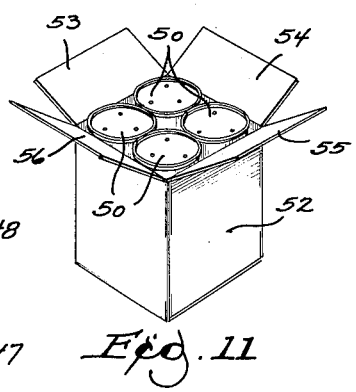
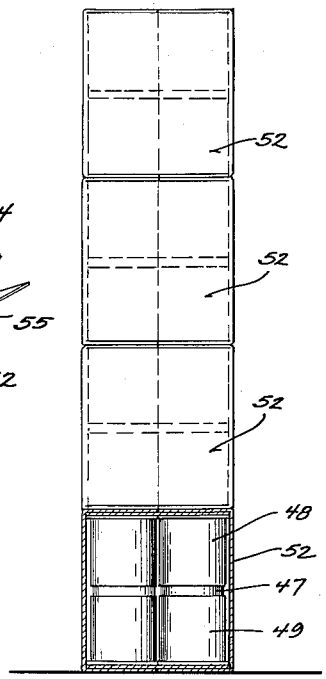
INVENTOR.
OLIN R. THOMPSON
BY
Wheeler, Wheeler & Wheeler
ATTORNEYS May 2, 1961  O. R. THOMPSON  2,982,661
METHOD FOR PRODUCING CONSUMER SIZE SEMI-CYLINDRICAL
PACKAGES OF CHEESE OF UNIFORM WEIGHT
Filed Jan. 20, 1958  3 Sheets-Sheet 3

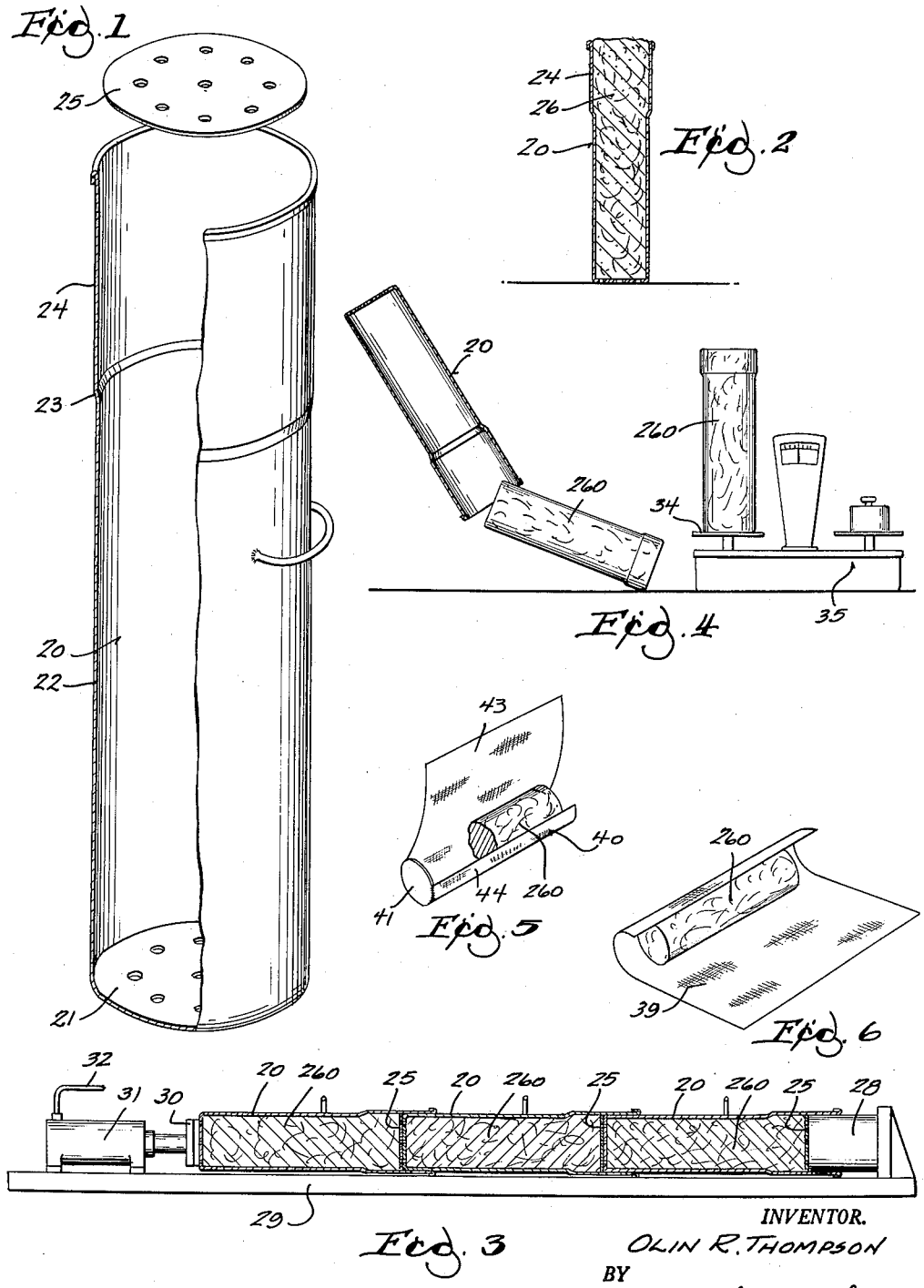

INVENTOR.
OLIN R. THOMPSON
BY
Wheeler, Wheeler & Wheeler
ATTORNEYS

United States Patent Office 2,982,661
Patented May 2, 1961

2,982,661

METHOD FOR PRODUCING CONSUMER SIZE SEMI-CYLINDRICAL PACKAGES OF CHEESE OF UNIFORM WEIGHT

Olin R. Thompson, Medford, Wis., assignor, by mesne assignments, to Armour & Company, Chicago, Ill., a corporation of Delaware Filed Jan. 20, 1958, Ser. No. 709,916

6 Claims. (Cl. 99—178)

This invention relates to the method and apparatus for producing consumer size semi-cylindrical packages of cheese of uniform weight.

For many years, cheese manufacturers have experienced considerable losses in endeavoring to conform the contents of cheese packages with the weight figures given on the labels. Cheese of the hard curd or Cheddar type is conventionally cured in a hoop which is not of uniform cross section but tapered slightly toward one end. In consequence, slices of uniform axial length cut from such a hoop are not of uniform weight. Variations in density further complicate the problem. In the past, a concern undertaking to make consumer size packages had the option of making substantial adjustments in weight of individual packages or allowing most of the packages to exceed by substantial amounts the weight printed on the label in order to make sure that all of the packages reach the prescribed weight.

This invention uses a novel hoop which is really a stainless steel mold of entirely uniform diameter throughout that portion of its length in which the curd is ultimately compressed but with a slightly enlarged bell-shaped end into which curd may be packed for subsequent compression into that portion of the mold which is of uniform diameter. After the curd receives its initial compression in such a mold, sufficient only to make it self-supporting and nearly cylindrical, it is removed and weighed, the operator adding or removing such curd as is required to conform to the desired standard. The cylinder of compressed curd includes cheese for many consumer size packages. Consequently, a single weight adjustment made at this time will, in view of the assurance of uniformity between the cuts subsequently made from this cylinder, eliminate any need for weighing the individual cuts when these are subsequently made and wrapped. After weight standardization, the block of curd resulting from the initial compression above described is placed in a specially designed press cloth whereupon it is replaced in the mold and subjected to further compression great enough to force substantially all of the curd into the smaller end of the mold. Here it remains for about sixteen hours, more or less. It is now a substantially true cylinder of cheese of uniform cross section and density.

The cheese cylinder is now removed from the mold, taken from the press cloth, wrapped in transparent wrapping film and placed in a specially devised telescopic container in which it is subjected to continuing pressure during whatever curing period is desired.

After curing, the cheese is again removed and the wrapping film used in curing is taken from it and the cheese is cut into slices of equal thickness. Because the block of cheese as molded and cured is almost perfectly cylindrical and uniformly compressed, every semi-cylindrical cut produced therefrom will be substantially identical in weight with every other such cut. The consumer size cuts thus made are now sealed in consumer type labels or wrappers also desirably made of transparent wrapping film. The resulting packages are then desirably reassembled in a generally cylindrical group which is placed in a telescopic container and subjected to continued pressure during any further period of storage and merchandising.

In the drawings:

Fig. 1 shows in perspective the novel cylindrical hoop used in the practice of this invention, portions of the wall being broken away.

Fig. 2 is a view on a smaller scale showing the hoop of Fig. 1 as it appears in cross section with its contents of cheese curd.

Fig. 3 is a view showing in cross section a series of hoops filled with curd and disposed in a press in which the curd is being densified.

Fig. 4 is a view showing in perspective and section the steps of removing the curd cylinder from the hoop and weighing it.

Fig. 5 is a view showing in perspective, with parts broken away, the placing of the curd cylinder in a special press cloth for the purpose of further treatment.

Fig. 6 is a view in perspective showing the use of a conventional press cloth for the practice of this wrapping step.

Fig. 7 is a view partially in side elevation and partially in section showing the step of compression of the cheese curd after the curd has been wrapped in the press cloth.

Fig. 8 shows in perspective the step of wrapping the resulting cheese block in wrapping film preliminary to putting it in a container for curing.

Fig. 9 is a view in perspective showing in relatively separated positions a wrapped block of cheese and encircling collar, and box ends for telescopic engagement over the cheese and collar.

Fig. 10 is a view on an enlarged scale showing in section the box ends engaged telescopically with the wrapped cylinder of cheese and collar portions of the collar and the wrapper being broken away to expose the cheese.

Fig. 11 shows a number of the containers of cheese cylinders associated in a carton of proper dimensions for maintaining pressure on the cheese during curing.

Fig. 12 shows in side elevation a stack of closed cartons in which cheese is packed for curing, one of the cartons being broken away in section to expose the telescopic containers shown in Figs. 10 and 11.

Figure 13:
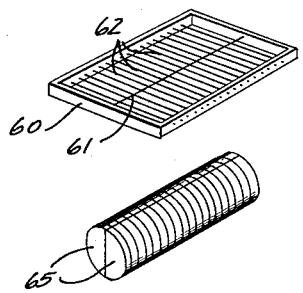
Fig. 13 is a view showing in relatively separated positions a cutting wire frame and a cylinder of cheese which has been subdivided by the wires of said frame into semi-cylindrical consumer size blocks.

The novel mold or "hoop" show in the drawings at 20 preferably comprises a stainless steel receptacle having an apertured bottom 21 and a wall portion 22 which comprises a tube of substantially perfectly uniform cross section. At a beveled shoulder 23 this tube is enlarged to provide a bell portion 24 which is only slightly larger in cross section than the tubular wall 22 in order to be able to receive the portion 22 of a like mold. The apertured disk 25 fits within the bell portion 24, its diameter being such that it cannot be pushed into the container beyond the shoulder 23.

The container 20 is filled with curd 26 as shown in Fig. 2, the amount of curd being sufficient to fill to its mouth the bell portion 24. The dimensions of the bell portion and the cylindrical portion of the container are so chosen that it will be possible under the pressure used in the press hereinafter described, to compress substantially all the curd into the cylindrical portion 22 of the mold. In practice, I use a mold in which the cylindrical tubular portion 22 is five and three-quarters inches in diameter by fifteen and one-quarter inches in length. The bell portion 24 is five and fifteen-sixteenths inches in diameter and six and five-eighths inches in length. Obviously, the proportions are chosen with reference to the desired pressure exerted by the press. Assuming that the pressure required is constant, it is evident that the volume of cheese in the bell portion will bear a substantially fixed ratio to the volume of the cylindrical tubular portion of the mold.

In the illustrated device, the bottom end of each mold is receivable telescopically into the bell portion of the next mold when two or more are assembled in series as represented in Fig. 3. One of the disks 25 is placed over the curd in each mold before the molds are assembled with each other in the series illustrated in Fig. 3. The press shown in Fig. 3 includes relatively movable members one of which is a fixed terminal piston 28 having a fixed mounting from the base 29. The other relatively movable press member, at the opposite end of the base, is the piston 30 of a ram. This piston engages the bottom of the end mold of the series to subject all of the curd to pressure throughout the series of molds. If the ram is hydraulic, fluid is admitted to the cylinder 31 through supply line 32. The pressure used at this point is just sufficient to consolidate the curd sufficiently to form a curd block which is self-supporting to permit handling.

The compressed curd 260 is now removed from the mold 20 as shown in Fig. 4 and is placed on the platform 34 of a scale 35. Assuming that the mold has been filled completely, no adjustment of weight may be necessary. The curd does vary somewhat in density and the skilled cheesemaker will, with practice, be able to know whether the bell portion 24 of the mold should be filled level full (if the curd is average) or whether it should be slightly overfilled as shown in Fig. 2 if the curd seems light. Because of the fact that the cheese is to be compressed into a true cylinder from which consumer size cuts of uniform axial length will be cut, it will be evident that a slight excess in the weight of the compressed curd block 260 will represent an insignificant overage in the weight of the consumer size units later to be cut therefrom. If the excess found in the weighing at this point is substantial, a portion of the curd can be cut away. If underweight at this point, curd can readily be added.

The curd block 260 of standardized weight is now wrapped in a press cloth. Fig. 6 shows the use of a conventional press cloth 39. In practice, it is preferred to use a special press cloth 40 which is prefabricated to provide a disk-like end 41 with the cloth stitched to about half of the periphery. The remaining portions 43 of the press cloth are wrapped around the curd block 260 when the block is placed therewithin as shown in Fig. 5.

The compressed curd block, wrapped in the press cloth, is now reinserted in the molds 20 and these are reassembled in the series and subjected to additional pressure in a press of the same type as that shown in Fig. 3. This time the pressure exerted is sufficiently great so that the residual whey is largely forced out and the several disks 25 (or 41) are forced substantially to the shoulders 23 of the molds, thus leaving substantially all of the cheese in the cylindrical tubular portions 22 of the molds.

Desirably, the cheese curd wrapped in the press cloth remains in the press for many hours in the step illustrated in Fig. 7. In practice, the press remains effective on the product for about sixteen hours. When the resulting cheese cylinder 45 is removed from the press cloth as shown in Fig. 8, it is of substantially uniform density and diameter from end to end.

After removal from the press cloth, the cheese cylinder 45 is enveloped in wrapping film 450 for the curing step. It has been found convenient to use "Saran" for this purpose. The wrapped cheese cylinder 46 is encircled by a cardboard collar 47 as shown in Fig. 9 and is inserted in generally cylindrical caps 48, 49 which telescope onto the collar 47 as best shown in Fig. 10 and have perforated end walls 50. Since it is desirable that pressure on the cheese continue during curing, the combined length of the end caps 48 and 49 is less than the length of the wrapped cheese cylinder 46 so that pressure exerted upon the end caps will be imposed on the cheese. A number of telescopic containers of the type shown in Fig. 10 are placed side by side in a strong carton 52 as shown in Fig. 11. Their height is desirably slightly in excess of the depth of the carton so that when the carton flaps 53, 54, 55 and 56 are closed over the carton contents, the telescopic containers, and the cheese therein, are subjected to pressure. In practice, a number of such cartons are stacked one upon another as shown in Fig. 12 for further maintaining pressure, particularly on the contents of the cartons below the tops of the respective stacks.

In accordance with conventional practice, the curing will continue for weeks, months or years according to the flavor desired.

Until the curing operation is complete, the cheese cylinders are not subdivided into consumer size pieces in the preferred practice of this invention. Since it is desirable that carbon dioxide produced by the cheese during curing should be permitted to escape, it is preferred that the wrapper 450 placed about the cheese cylinder 45 in the step of Fig. 8 be left unsealed. Since the labels in which the cheese is wrapped to make consumer size packages are desirably sealed, and would not let the gas escape, it is preferred that the subdivision of the cheese into consumer size pieces be deferred until after curing.

Figure 14:
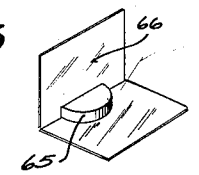
Fig. 14 is a view in perspective showing diagrammatically the wrapping of one of the consumer size blocks in a transparent label.
Figure 15:
Fig. 15 is a view in perspective showing the resulting consumer size package.
Figure 16:
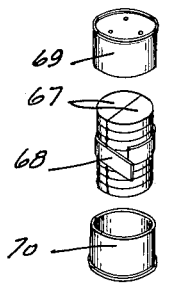
Fig. 16 is a view in perspective showing semi-cylindrical consumer size packages reassembled and encircled by a collar for the assembly of consumer size packages between telescopic end caps.
Figure 17:
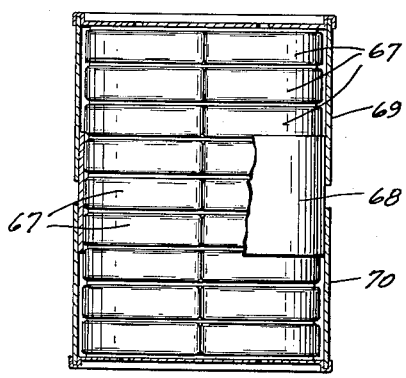
Fig. 17 is a view on an enlarged scale showing in section the telescopic container in which the consumer size packages are stacked, a portion of the collar being broken away.

Fig. 13 shows a cutting frame 60 having a longitudinal cutting wire 61 and a plurality of transverse cutting wires 62. When such wires are manipulated through the cured cheese cylinder, the cylinder is divided into a multiplicity of semi-cylindrical consumer size pieces such as those shown in Fig. 5 and Fig. 13. The cut made by the longitudinal wire 61 should be diametrical and the several transverse cutting wires 62 should be parallel and uniformly spaced. Since the cheese cylinder is of uniform length and cross section and density, in consequence of the compression in a cylindrical tube as received in the step of Fig. 7, all of the resulting consumer size pieces 65 should be of identical weight. These are then wrapped in the label films 66 as shown in Fig. 14 to produce the consumer package 67 of Fig. 15. The wrapping film which is used in practice has been "Saran."

Figure 18:
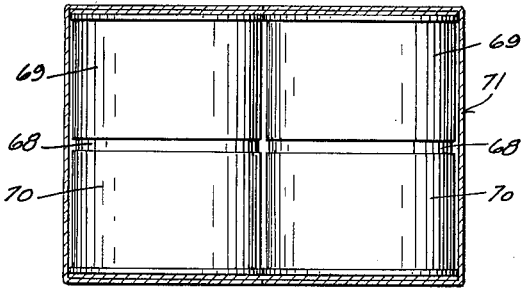
Fig. 18 is a view in transverse section through a carton in which a number of the cylindrical telescopic containers have been inserted for shipment and merchandising.

While the curing is presumably complete when the consumer size package is sealed, it is desirable to maintain the product under pressure during the period required for distribution and marketing. Accordingly, in the preferred practice of the invention, a number of the consumer size packages 67 are reassembled into a cylinder which, in practice, is generally half the size of the cylinder 45, containing half of the number of slices cut therefrom in the step of Fig. 13. As before, the assembled consumer size packages 67 are encircled by a cardboard or plastic collar 68 upon which the caps 69 and 70 are telescoped. The resulting containers are placed in cartons 71 under pressure as shown in Fig. 18 for transportation to the point of sale.

The stainless steel molds or hoops have been found to last indefinitely and by reason of the fact that the cheese is compressed into a cylinder of uniform cross section to substantially constant length and density, the financial loss involved in overweight and much of the weighing expense have been eliminated.

Not only are the molds 20 novel but the preferred prefabricated press cloths 40 have also effected considerable savings in time and increases in uniformity in cross section of the cheese cylinders from which the consumer pieces are cut.

I claim:

1. A method of producing semi-cylindrical consumer size cheese cuts of substantially identical weight, which method consists in compressing cheese curd to generally cylindrical form under pressure sufficient to agglomerate the curd as a self-supporting block, relieving the block of pressure, weighing the block and adjusting its weight if necessary to a predetermined standard of weight, placing the block within a press cloth and highly compressing the block to substantially true cylindrical form and uniform density, removing the resulting cheese cylinder from the press cloth and enveloping it in a wrapping film, curing the cheese cylinder in the wrapping film, and thereafter cutting the cured cheese cylinder diametrically and also transversely at points equally spaced axially of the cylinder, the resulting semi-cylindrical cuts being substantially identical in weight by reason of the uniform cross section and density of the cylinder.

2. The method recited in claim 1 in which film-wrapped cylinders of cheese are cured while under continued pressure.

3. The method recited in claim 1 in which the consumer size cuts are individually wrapped with label film, assembled into a group of cuts, and confined under pressure for transportation.

4. A method of producing consumer size packages of cheese cuts of uniform weight, said method comprising the steps of making cheese cylinders of uniform cross section and weight and density by molding an amount of cheese curd into a generally cylindrical self-supporting block longer than the desired cheese cylinder, weighing the block of molded curd and adjusting its weight, if necessary, to a predetermined standard, enveloping the block of cheese curd in a press cloth, subjecting the wrapped block of cheese curd to predetermined pressure to reduce its volume to that of the deisred cylinder, removing the resulting cheese cylinder from the press cloth and wrapping it in film for curing, confining the wrapped cheese cylinder under pressure and curing it while maintaining it subject to pressure, thereafter relieving the cheese cylinder of pressure and removing the curing wrapper and cutting the cylinder into consumer size cuts of per and cutting the cylinder into consumer size cuts of uniform axial length, wrapping the cuts individually and boxing the resulting cuts under pressure for sales distribution.

5. The method of molding a cylindrical block of cheese in a tubular mold of uniform cross section and using a prefabricated fitted press cloth having a semi-tubular portion and terminal disks and a wrap portion, said method comprising the steps of preliminarily molding curd to generally cylindrical form but non-uniform cross section, placing the generally cylindrical molded curd within the semi-tubular portion of the press cloth and enveloping it in the wrap portion of the press cloth, placing the enveloped generally cylindrical cheese curd within a tubular mold wall of uniform cross section from which a part of the wrapped curd extends, and compressing the wrapped curd into the cylindrical wall of the mold.

6. The method of molding cylindrical blocks of cheese in tubular mold sections having cylindrical portions of uniform cross section and respectively having larger terminal portions in which the cylindrical portions of successive mold sections are telescopically receivable, said method further including the use of prefabricated fitted press cloths having semi-tubular portions adapted to fit within the cylindrical portions of said mold sections, said press cloths having peripheral wrap portions, and also having end disks fitted to the larger terminal portions of the respective mold sections; said method comprising the steps of preliminarily molding curd in generally cylindrical blocks of non-uniform dimensions receivable within the semi-tubular portions of the respective press cloths, placing the generally cylindrical curd blocks within the semi-tubular portions of respective press cloths and enveloping them in the press cloths by extending the wrap portions of the respective press cloths about the blocks, placing the enveloped generally cylindrical curd blocks within the cylindricl portions of said mold sections, telescopically assembling the several mold sections with the end disk of a press cloth in one of said sections engaged with the end of the enveloped block of another section, and subjecting the several blocks within the several sections to series compression in a direction to mold the enveloped blocks in the respective cylindrical portions of the several sections, the disks of the enveloping press cloths being forced substantially to the ends of said cylindrical portions in the compressing operation.

References Cited in the file of this patent

UNITED STATES PATENTS

| | | |
|---|---|---|
| 757,301 | Haring | Apr. 12, 1904 |
| 1,130,635 | Roushar | Mar. 2, 1915 |
| 1,925,443 | Gere | Sept. 5, 1933 |
| 2,065,182 | Harris | Dec. 22, 1936 |
| 2,520,183 | Toone | Aug. 29, 1950 |
| 2,641,545 | Kraft | June 9, 1953 |
| 2,796,351 | Walter et al. | June 18, 1957 |
| 2,868,651 | Manwaring | Jan. 13, 1959 |